United States Patent Office 3,836,459
Patented Sept. 17, 1974

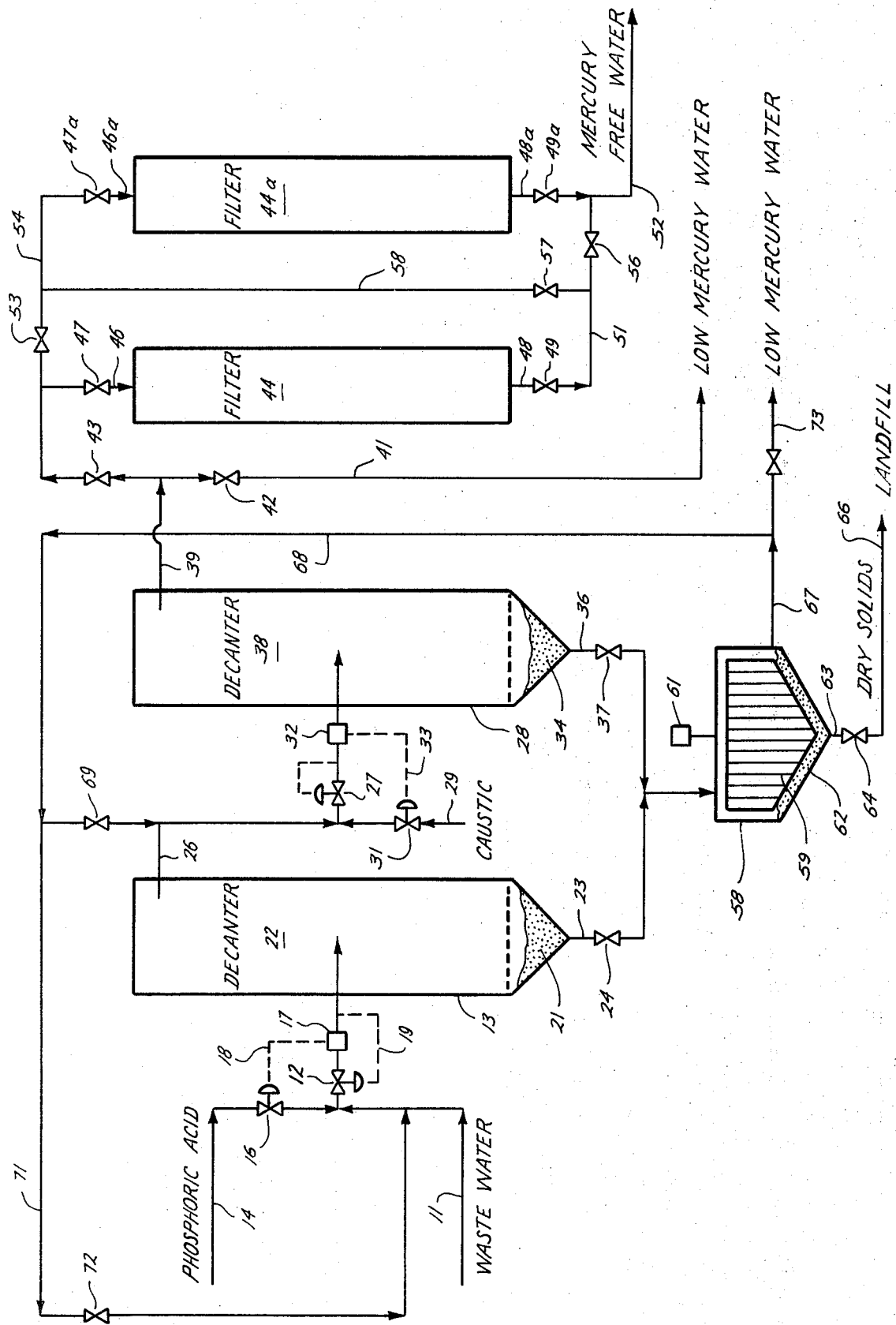

3,836,459
MERCURY REMOVAL FROM LATEX PAINT WASTE WATER
Ralph A. Shoberg and Paul E. Cravens, Houston, Tex., assignors to Petrolite Corporation, St. Louis, Mo.
Filed Dec. 18, 1972, Ser. No. 315,771
Int. Cl. C02b 1/18; C02c 5/02
U.S. Cl. 210—28                                    9 Claims

ABSTRACT OF THE DISCLOSURE

A process for the removal of organic mercury compounds and dispersed solids from waste water generated in the manufacture of water-thinned paints. The waste water receives an addition of phosphoric acid until the pH is adjusted to about 3.0. A major portion of the organic mercury compound (e.g., phenyl mercuric acetate) and water-dispersibled solids precipitate from the waste water. The precipitate is separated from the waste water. Then, the waste water is adjusted to a pH of at least about 7.5 by the addition of calcium hydroxide so that a substantially complete precipitation of the residual organic mercury compound and water-dispersibled solids is obtained. The precipitated solids are removed from the relatively mercury and solids free water phase. Then, the water phase is passed to a subsequent utilization. The precipitated mercury and solids may be treated to provide a substantially dry material suitable for landfill. A waste water with zero mercury content can also be produced.

BACKGROUND OF THE INVENTION

1. Field of the Invention

This invention relates to the purification of water contaminated by dispersed organic mercury compounds and water-dispersibled solids. More particularly, the present invention relates to the removal of organic mercury compounds from waste water generated in the manufacture of water-thinned paints which contain the organic mercury compounds as preservatives and fungicides.

2. Description of the Prior Art

The water-thinned paints, in relatively few decades, provide the major portion of the domestic residential finishing of painted interior and exterior surfaces. These paints are now being used in preference to the oil base paints. The water-thinned paint is a mixture of a filmogen, which is a film-forming material, a binder such as oxidizable linseed oil derivatives, fillers (calcium carbonate), and a pigment. Organic thinners may be used in small amounts to adjust the initial consistency of these water-thinned paints. Additional water may be added at the time of application if necessary to provide the desired consistency for covering the work surface. The water-thinned paints are commonly identified as latex paints. Latex paints contain natural rubber, but the nomenclature includes various synthetic polymers which can be acrylic, butadiene-styrene, polyvinyl acetate, and other like-functioning synthetic polymer filmogen materials. Water-thinned paints may also include: a material dispersible in the water, such as solubilized linseed oil; an emulsified polymer, such as butadiene-styrene; a cementatious material, such as cement or calcium carbonate; a water soluble silicate; and various pigments to obtain the desired coloring for the paint. It has been found with water-thinned paints that the filmogen and other ingredient materials of a proteinaceous nature act as a nutrient to many living organisms. The addition of an agent to retard growth of these living organisms is necessary to preserve the appearance of the paint both before and after application upon the work surface. Various preservatives and fungicides have been employed, but organic mercury compounds are predominately used in domestic paint manufacture. These organic mercury compounds include phenyl mercuric acetate, phenyl mercuric oleate, and other similar types of alkyl-mercuride and organic acid derivatives.

The manufacture of a major portion of the water-thinned paint is by a batch process. At the completion of a batch preparation of the paint, the various mixing and formulation vessels must be cleaned in preparation of receiving the ingredients from which the next succeeding batch of paint is to be prepared. This cleaning operation is especially critical when the subsequently prepared paint is of a substantially different color than the preceding batch of paint manufactured. Generally, the batch preparation vessels are washed with water, with substantial agitation and possible addition of detergent additives, so that all the residual amounts of the paint are removed in the waste water generated from this cleaning operation. Usually, the waste water contains very large concentrations of the organic mercury compound employed as the preservative and fungicide. An estimate, in average manufacturing procedures, has placed the concentration of the organic mercury compound at about 500 parts per million of the waste water. In addition, the waste water contains suspended water-dispersibled solids which are the solids residue of the water-thinned paint. The high concentration of mercury and other suspended solids makes the discharge unacceptable of the waste water into public water courses without severe chemical treatment to reduce the mercury and solids to acceptable levels.

Some prior art procedures employed complex steps for reducing the organic mercury compound to metallic mercury (or its inorganic salts) and formed a precipitate, and then discharged the separated precipitate in a suitable disposal such as retorting or incineration. These procedures are relatively complicated in procedure and employ relatively expensive mercuric ion reducing compounds.

The present-day environmental restrictions require a water to have a mercury content of not more than ten parts per billion before being discharged into public water courses. Additionally, the water must not have a solids content greater than a few hundred parts per mililon. Otherwise, the discharge of the waste water with suspended solids produces clouding and coloring of public water courses.

The present invention provides a process with uncritical and inexpensive procedural steps for the substantially complete removal of organic mercury compounds from waste water generated in the manufacture of water-thinned paints. An additional feature of the present process is the substantial reduction of the water-dispersibled solids contained in such waste water. The present process provides for the production of a treated waste water of zero mercury content which can be recycled in paint manufacture, or disposed in public water courses or employed in other water usages with no mercury hazards being involved.

SUMMARY OF THE INVENTION

The present invention is a process for the removal of an organic mercury compound from waste water generated in the manufacture of water-thinned paints containing a filmogen, binder, pigments, fillers and other water-dispersibled solids. The steps comprise adjusting the pH of the waste water to about 3.0 by the addition of phosphoric acid so that the major portion of the organic mercury compound and water-dispersibled solids precipitate from the waste water. The precipitate is separated from the waste water. Then, the waste water is adjusted to a pH of at least about 7.5 by the addition of metal hydroxide base so that a substantially complete precipitation of the residual organic mercury compound and water-dispersibled solids is obtained and thereby producing a relatively mercury-free water phase. These precipitated solids are removed from the relatively mercury-free water phase, and then the water phase is passed to a subsequent utilization. In additional embodiments, the precipitated solids may be prepared in a suitable form for disposal as a landfill. Also, a waste water with zero mercury content can be produced.

DESCRIPTION OF THE DRAWING

The drawing is a schematic flow diagram of an apparatus for performing the various steps of the process of the present invention.

DESCRIPTION OF SPECIFIC EMBODIMENTS

Referring to the drawing, an appartus is shown in which the steps of the present process can be practiced. However, the present process may be practiced in other apparatus as will be apparent from the present description. A supply of waste water derived from the manufacture of water-thinned paints, or any other source, is moved through an inlet conduit 11 and suitable mixer, such as mixing valve 12, into the decanter 13. The waste water usually has a pH of about 7, and if not neutral, then it is slightly basic. A stream of phospheric acid is introduced through an inlet conduit 14 into the stream of waste water in conduit 11 upstream of the mixing valve 12. The amount of phosphoric acid passing through the conduit 14 is regulated by a motor control valve 16 which valve is actuated by a pH sensor 17 providing a control signal represented by a chain line 18. The sensor 17 and valve 16 are adjusted so that phosphoric acid and water phase mixture has a pH of about 3.0 upon entering the decanter 13. A pH of about 3.0 is preferred in the operation of the decanter 13. However, an intermixing of the waste water and phosphoric acid to produce an aqueous mixture with a pH in the range of from about 2.5 to about 4.5 provides for satisfactory operation of the present process. The mixing valve 12 pressure differential is regulated by a downstream sensor generating a control signal indicated by chain line 19. The phosphoric acid and waste water are thoroughly mixed by passing through the valve 12 before being introduced into the settling conditions with the decanter 13. The controlled addition of phosphoric acid causes a major portion of the organic mercury compound and water-dispersibled solids to precipate from the waste water. These water-dispersibled solids include the filmogen, binders, fillers, pigments and other like water-dispersibled solid materials. The described pH adjustment by acidification of phosphate salts with mineral acid does not produce consistently the results provided by direct addition of phosphoric acid.

The decanter 13 separates a treated waste water with a highly reduced mercury and solids content from the precipitated solids. For this purpose, the decanter 13 has a construction such as batch settling tanks, unit settlers, or sedimentation tanks. Preferably, the decanter 13 has an inverted conical bottom in which the precipitated solids 21 accumulate. A relatively mercury and solids free waste water accumulates in the upper portion 22 of the decanter 13. For example, the waste water in the upper portion 22 may have a mercury content less than 10% of the incoming waste water in conduit 11. The solids 21 are removed through a sludge outlet 23 under the controlling action of a valve 24. These solids 21 may be removed on a discontinuous or continuous basis, as desired. The solids 21 removed from the decanter 13 usually have a residual water content of between 35 and 50% by weight depending upon the efficiency in solids separation of the decanter 13.

The treated waste water is removed from the upper portion 22 of the decanter 13 by an outlet 26 which conducts the waste water through a mixing valve 27 into the decanter 28. The mixing valve 27 is adjusted to provide a suitable pressure differential to the fluids flowing therethrough for a complete mixing of the treated waste water with a metal hydroxide base. The metal hydroxide base introduced through the conduit 29 in the decanter 28 can be an alkali metal or alkaline earth metal hydroxide. Preferably, these metal hydroxide bases are sodium hydroxide and calcium hydroxide. Calcium hydroxide is the preferred base to be employed in the present process. This base is introduced through the caustic inlet conduit 29 and through a motor control valve 31 into the stream of treated waste water upstream of the mixing valve 27. A pH sensor 32 is placed downstream of the mixing valve 27 and produces a signal, indicated by chain line 33, to operate the motor valve 31. The pH sensor 32 functions to regulate the flow of the metal hydroxide base so that the resultant base and water mixture has a pH of at least about 7.5 upon entry into the decanter 28. However, the pH of the base and water mixture may reside from slightly above 7.0 to about 9.0 for satisfactory operation of the steps performed in the decanter 28. The waste water and metal hydroxide base mixture within the decanter 28 undergoes a reaction which precipitates as solids 34 substantially all of the remaining water-dispersibled solids and residual organic mercury compound.

The decanter 28 has a construction which may be identical to the decanter 13, although other constructions may be employed. The precipitated solids 34 accumulate within the conical lower portion of the decanter 28. If desired, sludge raker arms (not shown) may be employed for substantially reducing the amount of occluded water within the solids 34. The solids 34 are removed from the decanter 28 in regulated amounts through an outlet 36 by the controlled actuation of the valve 37. The relatively mercury and solids free purified water phase accumulates in the upper portion 38 of the decanter 28. This purified water phase is removed through an outlet 39. Then the water phase can be passed through a first outlet conduit 41 to any suitable utilization.

Generally, the purified water phase has a mercury content in amounts of less then ten parts per billion. In many cases, careful operation of the decanter 28 produces a purified water phase having a residual mercury content of less than five parts per billion. If a completely mercury-free water is desired, an additional step is practiced. The block valve 42 in the conduit 41 is closed so that the water phase passes through a valve 43. The water phase can now pass from an inlet 46 controlled by valve 47 through a bed of adsorbent contained in filter 44. The filter 44 contains a suitable adsorbent such as Anthrafil® or activated charcoal. These adsorbents, and like materials, adsorb any residual mercury compound contained in the waste water. The mercury-free water is removed through an outlet 48 from the filter 44, passes through a control valve 49 into a treated water outlet 51, and lastly, it is directed to a subsequent utilization through a treated water line 52. The mercury-free water in the line 52 can be reintroduced into the manufacture of the water-thinned paint or can be delivered for disposal into public water courses. The mercury-free water in the line 52 has for practical purposes a zero solids content (filterable).

If desired, a second filter 44a may be employed in series or parallel flow to the filter 44. The second filter 44a and its associate components are denoted by the subscript "a" following the numerical designation for like parts in the filter 44. The filters 44 and 44a are operated in parallel water flow by opening a control valve 53 in conecting line 54 to place the filters in parallel operation. If series water flow is desired through the filters 44 and 44a, the valve 53 is closed, the block valve 56 in the water outlet 51 is closed and valve 57 in bypass conduit 58 is opened. As a result, the mercury-free water from the filter 44 passes through conduit 58 and into the inlet 46a of the filter 44a, and exits therefrom through the outlet 48a into the line 52 for subsequent utilization.

The solids 21 and 34 removed from the decanters 22 and 23 could be treated separately to reduce the occluded water contents. Preferably, these solids are combined and treated in a simultaneous operation. For this purpose, the solids are placed into a clarifier or thickener 58 which preferably includes a set of rotating sludge raker arms 59 above a conical bottom. The raker arms 59 are actuated by a prime mover 61 mounted above the thickener 58. The operation of the thickener 58 is conventional and separates the solids into relatively dewatered solid 62 which accumulated in the lower portion of the thickener 58. The solids 62 are removed through a sludge outlet 63 in regulated amounts by operation of the valve 64 and sent through a conduit 66 to a suitable disposal. For example, the thickener 58 produces solids 62 with a water content of less than 50%. In many cases, these solids have a water content of less than 35% by weight. The dewatered solids are substantially dry and can be disposed in a landfill or other non-polluting containment. If desired, the solids could be processed for recovering the mercury and other materials which they contain.

The thickener 58 produces a decant water phase which is removed through a water outlet 67. The decant water may be either basic or acidic depending upon the composition of the water phases occluded in the solids 21 and 34, and their relative amounts. If the decant water is acidic, it is preferably passed through conduit 68 and block valve 69 into admixture with the treated water removed by the outlet 26 from the decanter 13. If the decant water is basic, it is preferred to send the water through the conduits 68 and 71 and through the block valve 72 to be intermixed with the waste water passing through the inlet conduit 11 upstream of the mixing valve 12. If neither of these recycle functions is desired, the block valves 69 and 72 may be closed, and the decant water is delivered from the conduit 67 into an outflow conduit 73 for subsequent usages where a residual mercury content in the range of 10-50 parts per billion can be tolerated. However, for purposes of the present invention, the decant water in the conduit 67 should be recycled into one of the incoming streams to the decanters 22 and 38.

The operation of the present process steps destroy the organic mercury compound and produce precipitable mercury compounds through the addition of phosphoric acid and the metal hydroxide base. In addition, these two materials intermix with the waste water and serve to remove substantially all of the water-dispersibled solids including residual filmogen, fillers, pigments, and binder materials. As a result, the purified water phase removed from the outlet conduit 41 has an extremely low content of residual mercury material, and also water-dispersed solids. In many instances, this purified waste water phase can be disposed directly in public water courses. If a zero mercury level water is desired, the filters 44 and 44a are employed for this result.

From the foregoing, it will be apparent that there has been described a process well adapted for removal of organic mercury compounds, and water-dispersed solids, from waste water generated in the manufacture of water-thinned paints. Various step modifications may be practiced to insure that the purified water is completely free of residual mercury, and also suspended solids. These materials are covered as a dry solids phase which may be readily used as landfill. Only small amounts of the phosphoric acids and the metal hydroxide bases are required relative to the waste water flow since their change in pH of the waste water is relatively small. Thus, the expense of operating the process is relatively small. In addition, conventional apparatus can be used for the decanters 22 and 38, the thickener 58, and the filters 44 and 44a.

Various modifiecations and alterations in the described process will be apparent to those skilled in the art which do not depart from the spirit of the present invention. For this reason, these changes are desired to be included within the scope of the appended claims. The appended claims define the present invention; the foregoing description is to be employed for setting forth the present invention embodiments as illustrative in nature.

What is claimed is:

1. A process for the removal of organic mercury compounds from waste water generated in the manufacture of water-thinned paints containing a filmogen, binder, pigments, fillers and other water-dispersibled solids, the steps comprising:
    (a) adjusting the pH of the waste water to about 3.0 by the addition of phosphoric acid whereby a major portion of the organic mercury compound and water-dispersibled solids precipitate from the treated waste water;
    (b) separating the precipitate from the treated waste water, and then adjusting the pH of the treated waste water to at least about 7.5 by the addition of metal hydroxide base whereby a substantially complete precipitation of the residual organic mercury compound and water-dispersibled solids is obtained from a relatively mercury-free water phase; and
    (c) removing the precipitated solids from the relatively mercury-free water phase, and then passing said water phase to a subsequent utilization.

2. The process of Claim 1 wherein said water phase from step (c) is passed through a bed of activated charcoal to produce a completely mercury-free water phase.

3. The process of Claim 1 wherein said water phase from step (c) is passed through a bed of a solid adsorbent to produce a completely mercury-free water phase.

4. The process of Claim 1 wherein said precipitates from steps (a) and (c) are combined and dewatered to provide a relatively dry solids phase suitable for non-polluting disposal and a decant water phase.

5. The process of Claim 3 wherein said relatively dry solids are disposed as landfill.

6. The process of Claim 4 wherein the decant water phase removed in dewatering said dry solids is returned into the water phase in one of said steps (a) or (b) depending upon the pH of said decant water.

7. The process of Claim 1 wherein said organic mercury compound is a mercuric salt derivative of an organic acidic material.

8. The process of Claim 1 wherein said organic mercury compound is selected from the group consisting of phenyl mercuric acetate and phenyl mercuric oleate.

9. The process of Claim 1 wherein said metal hydroxide base is selected from the group consisting of sodium hydroxide and calcium hydroxide.

References Cited

UNITED STATES PATENTS

| | | | |
|---|---|---|---|
| 3,753,901 | 8/1973 | Taubman | 210—54 X |
| 3,764,528 | 10/1973 | Cadmus | 210—50 |
| 2,860,952 | 11/1958 | Bergeron et al. | 423—102 |
| 3,736,253 | 5/1973 | DeAngelis et al. | 210—28 X |

THOMAS G. WYSE, Primary Examiner

US. Cl. X.R.

210—50, 53

UNITED STATES PATENT OFFICE
CERTIFICATE OF CORRECTION

Patent No. 3,836,459          Dated September 17, 1974

Inventor(s) Ralph A. Shoberg and Paul E. Cravens

It is certified that error appears in the above-identified patent and that said Letters Patent are hereby corrected as shown below:

Column 4, line 70 for "conecting" read ---connecting ---;

Column 6, line 5 for "modiefications" read --- modifications ---; and

Column 6, line 44 for "The process of Claim 3" read --- The process of Claim 4 ---.

Signed and sealed this 7th day of January 1975.

(SEAL)
Attest:

McCOY M. GIBSON JR.
Attesting Officer

C. MARSHALL DANN
Commissioner of Patents